UNITED STATES PATENT OFFICE.

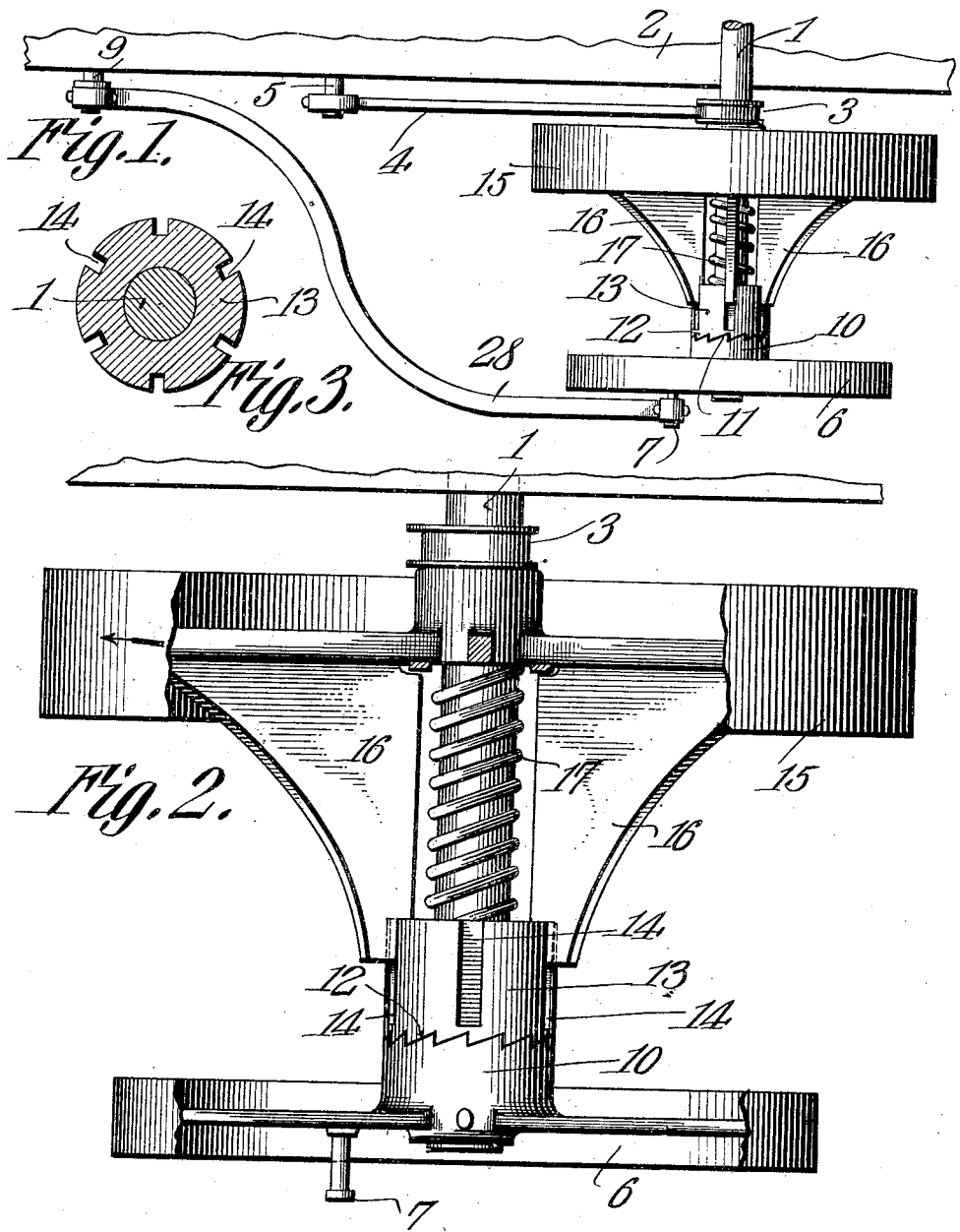

RAYMOND McLAUGHLIN, OF STORM LAKE, IOWA.

THRESHING-MACHINE SEPARATOR.

No. 922,615.      Specification of Letters Patent.      Patented May 25, 1909.

Application filed February 29, 1908. Serial No. 418,492.

*To all whom it may concern:*

Be it known that I, RAYMOND MCLAUGH-LIN, a citizen of the United States, residing at Storm Lake, in the county of Buena Vista and State of Iowa, have invented a new and useful Threshing-Machine Separator, of which the following is a specification.

This invention relates to grain separators and more particularly to mechanism whereby the shoe and tailer of a separating machine can be caused to continue to operate in the event of the cylinder of the machine becoming choked and stopping the driving mechanism. This is of course objectionable because it results in the undesirable mixing of straw and grain.

Another object is to provide means for operating the shoe and tailer by momentum in the event of the sudden stoppage of the driving mechanism.

A still further object is to provide simple and efficient means for automatically coupling and uncoupling the driving mechanism with relation to the shoe and tailer mechanism.

With these and other objects in view the invention consists in certain novel details of construction and combinations of parts hereinafter more fully described and pointed out in the claims.

In the accompanying drawings the preferred form of the invention has been shown.

In said drawings:—Figure 1 is a view of a portion of a separator and showing the present improvements applied thereto. Fig. 2 is an enlarged plan view of the parts constituting the present invention. Fig. 3 is a transverse section through the slidable member of the clutch.

Referring to the figures by characters of reference 1 designates the shaft mounted in suitable bearings and having an eccentric 3 thereon for actuating the pitman 4 of the shoe 5. Secured to the shaft at a point removed from eccentric 3 is a fly-wheel 6, having a wrist-pin 7 on which is mounted the pitman 8 of a tailer 9. Said fly-wheel is mounted to rotate with the shaft 1, and the hub thereof is formed with an inwardly projecting tubular extension 10, provided at its end with a circular series of ratchet teeth 11. These teeth are normally engaged by oppositely disposed similar teeth 12, formed at one end of the sleeve 13, which is slidably mounted on the shaft 1, and is provided in its outer face with parallel longitudinally extending grooves 14, clearly indicated in Fig. 3. A pulley 15 is loosely mounted on the shaft 1, between the sleeve 13 and the eccentric 3, one end of the hub of this pulley preferably bearing against the eccentric 3, while extending from the other end of the said hub and from the corresponding face of the pulley, are guide-plates 16, equal in number to the grooves 14, and so positioned as to project into these grooves and thus hold the sleeve 13 against rotation upon the shaft 1. A spring 17 is coiled around the shaft 1 and bears at its ends against the pulley 15 and the sleeve 13 respectively, said spring thus operating to hold the teeth 12 of the sleeve 13 normally in engagement with the teeth 11 on the tubular extension 10.

In the operation of the machine the pulley 15 is designed to be driven in the direction of the arrow by means of a belt, and, inasmuch as the sleeve 13 is rotated with the pulley and is held in engagement with the teeth 11 by means of the spring 17, it will be apparent of course that the fly-wheel 6 will also be rotated, and the shaft 1 and the eccentric 3 thus actuated. Motion will thus be transmitted from the pulley 15 to the shoe and tailer through eccentric 3 and wrist-pin 7 respectively. Should the cylinder of the separator become choked, as is often the case in machines of this character, the mechanism driving the pulley 15 will of course stop, and, ordinarily, this results in the stoppage of the shoe and tailer, with the result that the grain and straw become commingled to an undesirable extent. In the present construction, however, should the pulley 15 stop suddenly, the shaft 1 of the parts connected thereto will continue to rotate under the momentum imparted to the fly-wheel 6, and the shoe and tailer will thus continue to work, the independent rotation of the fly-wheel being permitted in view of the fact that the teeth 11 will slip over the non-rotatable teeth 12, forcing the sleeve 13 against the stress of the spring 17. As soon as the pulley 15 again begins to operate, the sleeve 13 will reëngage the teeth 11 and continue to actuate the fly-wheel 6. It will be seen therefore that during short stops of the mechanism driving the pulley 15, the shoe and tailer will not cease to operate, and therefore better results are obtained than would otherwise be the case.

What is claimed is:—

1. The combination with a shaft, a fly-wheel secured thereto, and driving mechanism actuated by the fly-wheel; of a clutch member movable with the fly-wheel and shaft, a pulley loosely mounted on the shaft, guide devices extending laterally therefrom and spaced from the shaft, and a spring-pressed clutch member slidably mounted on the shaft and engaging said guide devices, said member normally engaging the first mentioned clutch member.

2. The combination with a shaft, a fly-wheel secured thereto, a clutch member upon the fly-wheel and having ratchet teeth, and mechanism actuated by the fly-wheel; of a pulley loosely mounted on the shaft, laterally extending radial guide devices upon the pulley and spaced from but parallel with the shaft, and a spring-pressed clutch member slidably mounted on the shaft and guide devices, and having ratchet teeth normally engaging the teeth of the first mentioned clutch member.

3. The combination with a shaft, a fly-wheel secured thereto and revoluble therewith, mechanism connected to and actuated by the fly-wheel, and a clutch member upon said fly-wheel and having a circular series of ratchet teeth; of a pulley loosely mounted on the shaft, laterally extending guide devices disposed radially upon the pulley, and spaced from but parallel with the shaft, a clutch member slidably mounted on the shaft and having longitudinal grooves for the reception of the guide members, said clutch member having a circular series of ratchet teeth, and a spring interposed between said clutch member and the pulley for holding said member normally in engagement with the clutch member upon the fly-wheel.

4. In a device of the class described, a shaft, a fly-wheel secured thereto and revoluble therewith, mechanism connected to and actuated by the fly-wheel, a clutch member carried by the fly-wheel, a pulley revolubly mounted on the shaft, and a spring-controlled clutch member revoluble with the pulley and slidable on the shaft into and out of engagement with the first mentioned clutch member, said clutch members being disposed to automatically disengage during the sudden stoppage of the pulley.

In testimony that I claim the foregoing as my own, I have hereto affixed my signature in the presence of two witnesses.

RAYMOND McLAUGHLIN.

Witnesses:
M. M. MOULTON,
A. G. SHADDINGER.